US012571412B2

(12) United States Patent (10) Patent No.: US 12,571,412 B2
Schulze et al. (45) Date of Patent: Mar. 10, 2026

(54) FLUID SYSTEM FOR A VEHICLE

(71) Applicant: ECO Holding 1 GmbH, Marktheidenfeld (DE)

(72) Inventors: Dietmar Schulze, Münzenberg (DE); Andre Selke, Lohr (DE)

(73) Assignee: ECO Holding 1 GmbH (DE)

( * ) Notice: Subject to any disclaimer, the term of this patent is extended or adjusted under 35 U.S.C. 154(b) by 0 days.

(21) Appl. No.: 18/850,882

(22) PCT Filed: Mar. 1, 2023

(86) PCT No.: PCT/EP2023/055204
§ 371 (c)(1),
(2) Date: Sep. 25, 2024

(87) PCT Pub. No.: WO2023/186442
PCT Pub. Date: Oct. 5, 2023

(65) Prior Publication Data
US 2025/0222736 A1 Jul. 10, 2025

(30) Foreign Application Priority Data
Mar. 31, 2022 (DE) ..................... 10 2022 107 714.4

(51) Int. Cl.
B60G 17/015 (2006.01)
B60G 17/017 (2006.01)
F15B 13/02 (2006.01)

(52) U.S. Cl.
CPC ........ F15B 13/027 (2013.01); B60G 17/0152 (2013.01); B60G 17/017 (2013.01);
(Continued)

(58) Field of Classification Search
CPC .......................... B60G 17/015; B60G 17/0152; B60G 17/017; B60G 2202/413; B60G 2202/414;
(Continued)

(56) References Cited

U.S. PATENT DOCUMENTS

2002/0149248 A1* 10/2002 Jackson ..................... F15B 7/02
                                                     297/330
2004/0113377 A1* 6/2004 Klees ................... B60G 21/073
                                                     280/5.514
2007/0170680 A1* 7/2007 Knaap .................. B60G 17/056
                                                     280/124.106
2017/0240019 A1* 8/2017 Six ..................... B60G 17/0416
(Continued)

FOREIGN PATENT DOCUMENTS

CN      108798891 B  * 12/2020  ............... F16C 7/06
DE  102017103915 A1 *  8/2017  ............... F15B 1/04
(Continued)

OTHER PUBLICATIONS

International Search Report for Application No. PCT/EP2023/055204 mailed May 10, 2023. 3 pages.

*Primary Examiner* — Keith J Frisby
(74) *Attorney, Agent, or Firm* — Lerner David LLP

(57) ABSTRACT

A fluid system for a vehicle includes a pump for delivering a fluid, wherein the pump has a first and a second fluid connections, a first and a second actuators to be connected to the first fluid connection via a first and a second actuator valves, respectively, wherein the pump is designed to deliver fluid in a first delivery direction and in a second delivery direction, so that the first actuator and the second actuator are fluidically pressurized by the pump via the first fluid connection when the pump delivers in the first delivery direction, and a control valve for controlling the first and the second actuator valves. The control valve is fluidically separated from the second fluid connection when the pump delivers in the first delivery direction, and the control valve is connected to the second fluid connection when the pump delivers in the second delivery direction.

14 Claims, 3 Drawing Sheets

(52) U.S. Cl.
CPC .. *B60G 2202/413* (2013.01); *B60G 2202/414* (2013.01); *B60G 2202/415* (2013.01); *B60G 2202/416* (2013.01); *B60G 2204/47* (2013.01); *B60G 2204/80* (2013.01); *B60G 2400/252* (2013.01); *B60G 2500/30* (2013.01); *B60G 2600/182* (2013.01); *B60G 2800/20* (2013.01); *B60G 2800/914* (2013.01); *F15B 2211/30525* (2013.01)

(58) Field of Classification Search
CPC ........ B60G 2202/416; B60G 2202/415; B60G 2204/47; B60G 2204/80; B60G 2400/252; B60G 2500/30; B60G 2600/18; B60G 2600/182; B60G 2800/20; B60G 2800/914; F15B 2211/30525
USPC ............. 280/6.157, 5.514, 124.157, 124.16, 280/124.159; 701/37
See application file for complete search history.

(56) References Cited

U.S. PATENT DOCUMENTS

| | | | |
|---|---|---|---|
| 2017/0267050 A1 | 9/2017 | Stolle | |
| 2018/0037083 A1* | 2/2018 | Seminara | B60G 17/0408 |
| 2023/0112405 A1* | 4/2023 | Calchand | B60G 11/265 |
| | | | 280/5.515 |
| 2023/0294476 A1* | 9/2023 | Birch | B60G 21/073 |
| | | | 280/5.515 |

FOREIGN PATENT DOCUMENTS

| | | | | |
|---|---|---|---|---|
| DE | 102017121499 B3 * | 8/2018 | | E05F 15/53 |
| DE | 102017107994 B4 | 4/2021 | | |
| DE | 102020105270 A1 | 9/2021 | | |
| DE | 112020001989 T5 * | 1/2022 | | B60G 17/08 |
| EP | 0803385 A2 * | 10/1997 | | B60G 17/016 |
| JP | 2000264034 A * | 9/2000 | | |
| WO | 2016096837 A1 | 6/2016 | | |

\* cited by examiner

FLUID SYSTEM FOR A VEHICLE

CROSS-REFERENCE TO RELATED APPLICATIONS

The present application is a national phase entry under 35 U.S.C. § 371 of International Application No. PCT/EP2023/055204, filed Mar. 1, 2023, published in German, which claims priority to German Application No. 10 2022 107 714.4, filed Mar. 31, 2022, the disclosures of which are incorporated herein by reference in their entireties.

TECHNICAL FIELD

The invention relates to a fluid system for a vehicle, preferably for a vehicle chassis. The fluid system comprises a pump for delivering a fluid, wherein the pump has a first fluid connection and a second fluid connection. In addition, the fluid system comprises a first actuator which can be connected to the first fluid connection in a fluid-communicating manner via a first actuator valve, and a second actuator which can be connected to the first fluid connection in a fluid-communicating manner via a second actuator valve.

PRIOR ART

Fluid systems of this type are known in the prior art. Pneumatic systems, that is to say compressed air systems, are generally used particularly for use in vehicle chassis, for example in chassis of motor vehicles. The known pneumatic systems are constructed in such a way that an actuator is assigned to a shock absorber or at least to each vehicle axle in order to selectively raise and/or release the vehicle.

In order to be able to raise the vehicle, the actuators are each acted upon selectively with pneumatic pressure by a pump. In order to be able to release the vehicle, the pneumatic system generally comprises a complex valve arrangement. The individual valves of this valve arrangement are controlled electronically in the prior art in order to regulate the raising and lowering of the respective actuators.

Furthermore, the release of the vehicle with known pneumatic systems always necessitates that the vehicle has a certain dead weight so that the actuators are compressed by the vehicle mass when the vehicle is lowered.

The fluid systems known from the prior art have the disadvantage that they usually require a complex valve arrangement. Furthermore, electronically controlled valves are relatively costly to manufacture and have a relatively high susceptibility to errors. Last but not least, the known pneumatic systems have the problem that lowering is often possible only to a limited extent. In particular when the vehicle is standing on a slope and/or at an angle, it cannot always be ensured that the actuators are compressed to the desired extent. A further disadvantage is that the pumps known in the prior art have complex and sometimes very costly control units.

SUMMARY OF THE INVENTION

It is an object of the invention to provide a fluid system for a vehicle which at least partially overcomes the disadvantages from the prior art. It is in particular an object of the invention to provide a fluid system for a vehicle which can be manufactured cost-effectively, functions reliably and has a low susceptibility to errors during operation.

According to the invention, a fluid system for a vehicle, preferably for a vehicle chassis, is proposed. The fluid system can be, for example, a hydraulic system, wherein the fluid is preferably a hydraulic liquid, in particular a hydraulic oil. The fluid system comprises a pump for delivering a fluid, wherein the pump has a first fluid connection and a second fluid connection, a first actuator which can be connected to the first fluid connection in a fluid-communicating manner via a first actuator valve, a second actuator which can be connected to the first fluid connection in a fluid-communicating manner via a second actuator valve, wherein the pump is designed to deliver fluid to be delivered in a first delivery direction and in a second delivery direction opposite the first delivery direction, so that the first actuator and the second actuator are fluidically pressurized by the pump via the first fluid connection when the pump delivers in the first delivery direction, and a control valve for controlling, preferably for fluidically controlling, the first actuator valve and the second actuator valve, wherein the control valve is fluidically separated from the second fluid connection when the pump delivers in the first delivery direction, and the control valve is connected to the second fluid connection in a fluid-communicating manner when the pump delivers in the second delivery direction.

In the present case, the term actuator refers to a structural unit which converts a pressure change within the structural unit into a mechanical movement. The pressure change within the structural unit is preferably caused by a fluid pressure change within the structural unit. The "actuator" can be, for example, a hydraulic actuator.

In the present case, the term "fluidic relief" is understood to mean a hydrostatic relief in which the fluid pressure within the actuator is at least compensated by an external exertion of force on the actuator. According to the invention, the fluid pressure within the actuator is caused by the pump in addition to or as an alternative to the external exertion of force, namely when the pump pumps in the second delivery direction.

The fluidic relief of the actuator by reversing the delivery direction of the pump has the effect that the actuator can be reliably relieved or compressed independently of the position, in particular the inclination, of the vehicle. Furthermore, in the fluid system according to the invention, the number of valves can be reduced to a minimum, which additionally reduces the manufacturing costs. Furthermore, in the fluid system according to the invention, the construction of the valves can be made less complex and therefore also relatively cost-effective to manufacture. The fluid system according to the invention has the additional advantage that it ensures a high reliability during operation at low manufacturing costs.

According to an exemplary embodiment, the control valve can be hydraulically controlled. This achieves the technical advantage, for example, that complex control units are no longer required to control the control valve. For example, the control valve can be controlled by means of different fluid pressures which are achieved by means of a targeted rotation rate control of the assigned pump. Thus, fluid can be delivered by the pump in the second delivery direction, wherein the rotation rate of the pump correlates with a specific fluid pressure at the control valve. A specific applied fluid pressure thus corresponds to a specific switching position. Hydraulic fluid flows out of the control valve back into a reservoir via an orifice opening. This can take place, for example, independently of the rotation rate of the pump and thus also independently of the pressure level applied at the radial opening.

For example, the pump is a rotary pump. The pump can be an internal gear pump, an external gear pump or a rotary vane pump. Preferably, the pump is a rotary vane pump. If the pump is designed as a rotary pump, a change in the delivery direction can be caused by a change in the direction of rotation of the pump. In addition, the rotation rate and thus the fluid pressure can be varied. As a result, the pump can be used much more efficiently in the fluid system. For example, the suction and the pressure functionality of the pump can be actively utilized directly. Accordingly, such a pump has the advantage that no additional valves and/or no additional pumps are required for the fluidic relief. Rather, it can be sufficient to connect the pump to the actuator in a fluid-communicating manner.

According to an advantageous embodiment, the control valve has a first switching position which can be set by means of operation of the pump at a first rotation rate via the second delivery direction. This achieves the technical advantage, for example, that the first switching position can take place via operation of only the pump at a first rotation rate. As a result of the first rotation rate, a defined fluid pressure occurs which overcomes a check valve and thereby initiates the first switching position of the control valve. The hydraulic fluid flows out of the control valve back into a reservoir via an orifice opening. It is particularly advantageous here that the control of the switching position can be implemented easily and no complex control units are required for the control valve. The first switching position can also be referred to as the first control valve position.

According to an advantageous embodiment, the control valve has a first switching position which can be set by applying a first fluid pressure to the control valve. This achieves the technical advantage, for example, that the first switching position can take place via generation of only the first fluid pressure by operation of the pump at a first rotation rate. As a result of the first rotation rate, the first fluid pressure occurs which overcomes a check valve and thereby causes the first switching position of the control valve to be reached. The hydraulic fluid flows out of the control valve back again into a reservoir via an orifice opening. It is also particularly advantageous here that the control of the switching position can be implemented easily and no complex control units are required for the control valve. The first switching position can also be referred to as the first control valve position.

According to an additional embodiment, the second actuator is connected to the second fluid connection in a fluid-communicating manner via the second actuator valve when the control valve features the first switching position. This achieves the technical advantage, for example, that the second actuator can form part of an actuator in a chassis of a vehicle. The second actuator can be arranged in particular on a further shock absorber of a vehicle and can be connected to the first fluid connection of the pump via the second actuator valve and can thus be controlled independently.

According to a further advantageous embodiment, the control valve has a second switching position which can be set by means of operation of the pump at a second rotation rate via the second delivery direction. This achieves the technical advantage, for example, that the second switching position can also take place only via operation of the pump at a second rotation rate. As a result of the second rotation rate of the pump, a defined fluid pressure occurs which differs from the first fluid pressure and thereby initiates the second switching position of the control valve. Switching from the first switching position of the control valve to the second switching position of the control valve takes place, for example, by increasing the rotation rate from the first rotation rate to the second rotation rate. Even at this rotation rate, the hydraulic fluid flows out of the control valve back again into a reservoir via an orifice opening. It is also still advantageous that the control of a switching position and the switching of the switching position can be implemented easily and no complex control units are required for the control valve. The second switching position can also be referred to as the second control valve position.

According to an advantageous embodiment, the control valve has a second switching position which can be set by applying a second fluid pressure to the control valve. This achieves the technical advantage, for example, that the second switching position can take place via generation of only the second fluid pressure by operation of the pump at a second rotation rate. As a result of the second rotation rate of the pump, the second fluid pressure occurs which differs from the first fluid pressure and thereby causes the second switching position of the control valve. Switching from the first switching position of the control valve to the second switching position of the control valve takes place, for example, by increasing the rotation rate from the first rotation rate to the second rotation rate. As a result of the second rotation rate, the second fluid pressure occurs which overcomes a check valve and thereby initiates the second switching position of the control valve to be reached. The hydraulic fluid flows out of the control valve back again into a reservoir via an orifice opening. It is also particularly advantageous that the control of the switching position can be implemented easily and no complex control units are required for the control valve. The second switching position can also be referred to as the second control valve position.

According to a further particularly advantageous embodiment, the first actuator is connected to the second fluid connection in a fluid-communicating manner via the first actuator valve and the second actuator is connected to the second fluid connection via the second actuator valve when the control valve features the second switching position. The control valve is designed to conduct the fluid pressure of the hydraulic liquid to the control connection of the first actuator valve and to the control connection of the second actuator valve. This achieves the technical advantage, for example, that the first and the second actuator can each form part of an actuator in a chassis of a vehicle. The first actuator can be arranged on a further shock absorber of a vehicle, as a result of which the first and the second actuator can be connected to the first fluid connection of the pump and can thus be controlled.

According to an additional advantageous embodiment, the control valve has a third switching position which can be set by means of operation of the pump at a third rotation rate via the second delivery direction. This achieves the technical advantage, for example, that the third switching position can also take place only via operation of the pump at a third rotation rate. As a result of the third rotation rate of the pump, a defined fluid pressure occurs which differs from the first fluid pressure and from the second fluid pressure and thereby initiates the third switching position of the control valve. Switching from the first switching position of the control valve to the third switching position of the control valve or switching from the second switching position of the control valve to the third switching position of the control valve takes place, for example, by appropriate adaptation of the rotation rate to the third rotation rate. Even at this third rotation rate, the hydraulic fluid flows out of the control valve into a reservoir via an orifice opening. It is also still advantageous that the control of a switching position and the switching of the switching position can be implemented easily and no complex control units are required for the control valve. In addition, it would also be conceivable to provide further switching positions which can each be set via further defined rotation rates or rotation rate intervals. For example, a fourth switching position with a fourth rotation rate, a fifth switching position with a fifth rotation rate, etc. are possible. The third switching position can also be referred to as the third control valve position.

According to an advantageous embodiment, the control valve has a third switching position which can be set by applying a third fluid pressure to the control valve. This achieves the technical advantage, for example, that the third switching position can take place via generation of only the third fluid pressure by operation of the pump at a third rotation rate. As a result of the third rotation rate of the pump, the third fluid pressure occurs which differs from the first fluid pressure and from the second fluid pressure and thereby causes the third switching position of the control valve to be reached. Switching from the first switching position of the control valve to the third switching position of the control valve or switching from the second switching position of the control valve to the third switching position of the control valve takes place, for example, by appropriate adaptation of the rotation rate to the third rotation rate. The hydraulic fluid flows out of the control valve back again into a reservoir via the orifice opening. It is also particularly advantageous that the control of the switching position can be implemented easily and no complex control units are required for the control valve. The second switching position can also be referred to as the second control valve position.

According to a further particular embodiment, the first actuator is connected to the second fluid connection in a fluid-communicating manner via the first actuator valve when the control valve features the third switching position. When the control valve is moved or switched into the third switching position, the control valve is designed to conduct the hydraulic fluid to the control connection of the first actuator valve. This achieves the technical advantage, for example, that the first actuator can be formed as part of an actuator in a chassis of a vehicle. The first actuator can be arranged on a shock absorber of a vehicle and can be connected to the first fluid connection of the pump via the first actuator valve and can thus be controlled independently.

According to an additional advantageous embodiment, the second rotation rate of the pump is greater than the first rotation rate, and the third rotation rate of the pump is greater than the second rotation rate. For example, the first rotation rate, the second rotation rate and the third rotation rate correspond to rotation rate ranges. For example, the rotation rate ranges correspond to pressure ranges of the fluid. Thus, the first rotation rate range could correspond to a pressure range of the fluid of 0 bar to 30 bar, the second rotation rate range could correspond to a pressure range of 30 bar to 60 bar and the third rotation rate range could correspond to a pressure range of 60 bar to 90 bar.

According to a particularly advantageous embodiment, the first actuator valve and/or the second actuator valve can each be connected to a reservoir. This achieves the technical advantage, for example, that in the event of the fluid flowing out of the first and/or the second actuator via the first and/or the second actuator valve, the entire volume flow does not have to flow back via the pump. Instead, at least some of the fluid can flow out into the reservoir. In other words, the rotation rate of the pump has no influence on a lowering speed of the first and/or the second actuator.

According to an additional particularly advantageous embodiment, the first actuator valve and/or the second actuator valve each comprise a pin-shaped extension which is designed for transferring a closing element from a closed position, in which the closing element rests in a valve seat, into an open position, in which the closing element is spaced apart from the valve seat. Since the check valve prevents fluid from escaping from the first actuator via the first actuator valve or from the second actuator via the second actuator valve, the actuators remain closed in the switched-off state of the entire fluid system. In the specific application in a vehicle chassis, this has the advantage that a stable chassis state is achieved when a vehicle is parked. The closing element thus remains in principle in the closed state owing to the internal pressure of the actuator, wherein the internal pressure of the actuator is caused by the dead weight of the vehicle. When the first actuator valve and/or the second actuator valve are actuated by the appropriate switching position of the control valve, the pin-shaped extension acts directly on the closing element and lifts the closing element off the valve seat.

According to a particularly advantageous embodiment, the pin-shaped extension interacts with the valve seat of the closing element and is designed as a throttling cross section for a fluid flow. This achieves the technical advantage, for example, that the pin-shaped extension of the actuator valve with the valve seat opening in the valve seat of the closing element forms a circular throttling cross section for the volume flow when fluid flows out of the actuator. In the non-actuated state, the pin-shaped extension is retained by a resetting spring to such an extent that the flow cross section is not narrowed when the actuator is filled. Therefore, when the pump is actuated in the first delivery direction, fluid can flow through an actuator valve inlet into the first and the second actuator valve when the respective actuator valve is in the first actuator valve position. The closing element is transferred into an open state by the delivery pressure of the pump when the delivery pressure exceeds the internal pressure of the actuator. The actuator is thus filled by fluid flowing in through the actuator valve inlet. When the pump is actuated at a first rotation rate via the second delivery direction and the control valve is thereby transferred into the second actuator valve position, the pin-shaped extension comes into contact with the closing element. The pin-shaped extension comes into contact with the closing element through the valve seat opening, as a result of which the pin-shaped extension of the actuator valve forms a circular throttling cross section with the internal diameter of the valve seat opening in the valve seat of the closing element. The circular throttling cross section makes it possible to precisely control the volume flow when fluid flows out of the actuator. When fluid flows out of the actuator, it flows through the throttling cross section, an outlet connecting channel and passes from an actuator valve outlet into a reservoir.

According to a special advantageous embodiment, the control valve comprises a 4/3 directional control valve.

In order to form the control valve so as to be particularly unsusceptible to wear and at the same time to ensure the necessary functional properties, the control valve comprises a stepped piston comprising a band check valve and having a radial opening. The band check valve is arranged between the stepped piston and the housing of the control valve. As a result of the resetting force of the band check valve, the radial opening of the control valve, which is designed for fluid to flow into the control valve, is closed from an inner side of the housing of the control valve. When a critical pressure threshold is reached, the fluid overcomes the reset-
ting force of the band check valve and flows into the control
valve. Within the band check valve, the stepped piston can
be moved translationally between different switching posi-
tions. The stepped piston is particularly suitable for realizing
different switching positions by means of different fluid
pressures. For example, the stepped piston comprises a
compression spring which holds the stepped piston in the
first switching position in a pressureless state. When a
critical pressure threshold is reached, the band check valve
is overcome and fluid flows into the stepped piston via the
radial opening.

The fluid system can be provided for use in a vehicle, in
particular in a motor vehicle. The fluid system can be
provided, for example, in the chassis of a vehicle, in
particular of a motor vehicle. Preferably, the first actuator
and the second actuator each form a suspension strut actua-
tor of the vehicle chassis, in particular of a motor vehicle
chassis. For example, the first actuator and the second
actuator can be assigned to a vehicle axle.

Further advantageous embodiments and combinations of
features of the invention result from the following detailed
description and the totality of the patent claims.

BRIEF DESCRIPTION OF THE DRAWINGS

The drawings used to explain the exemplary embodiment
show.

In principle, identical parts are provided with identical
reference symbols in the figures.

WAYS OF CARRYING OUT THE INVENTION

Figure 1:
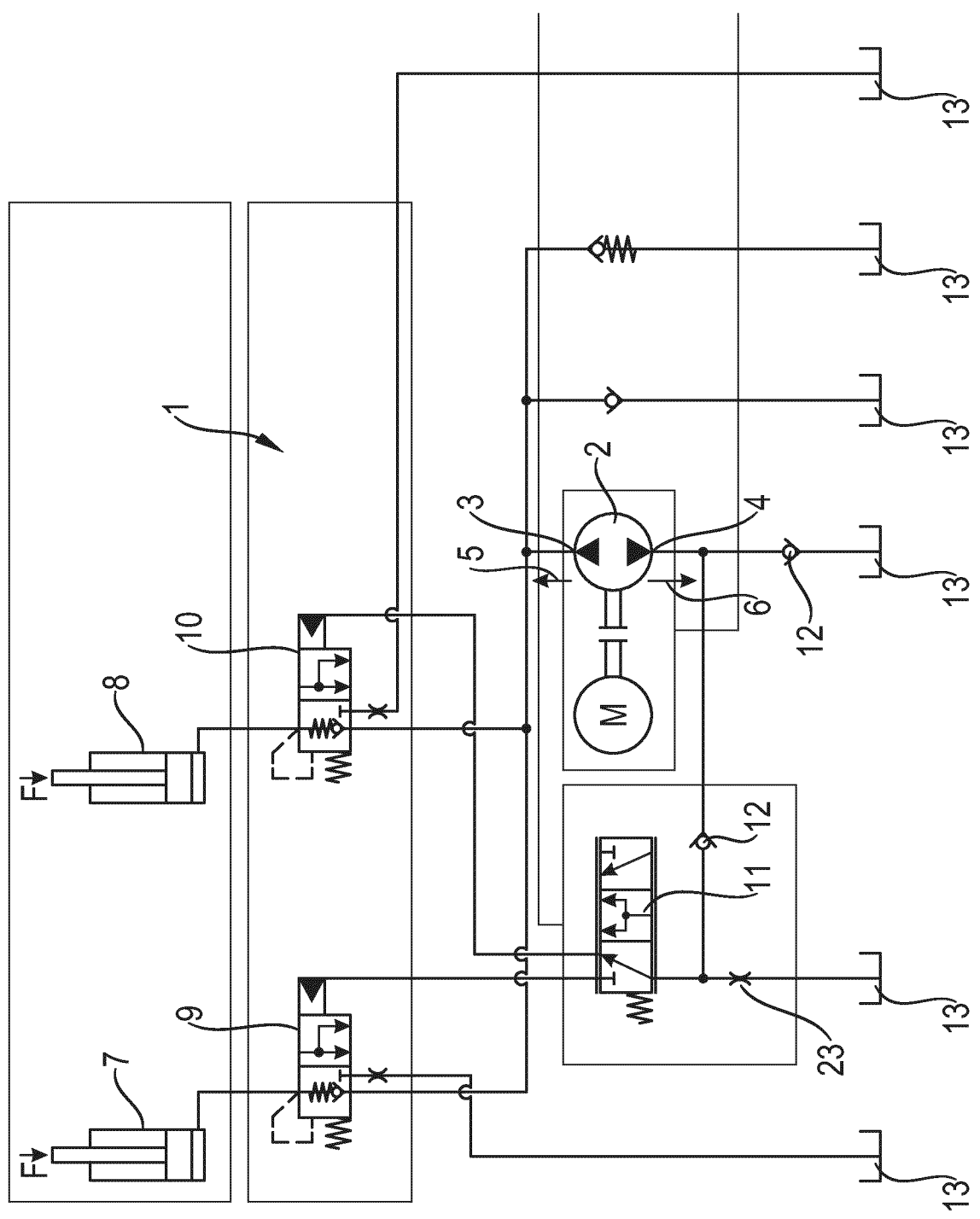
FIG. 1 a schematic hydraulic diagram of an exemplary
embodiment of a fluid system.

FIG. 1 shows a schematic hydraulic diagram of an exem-
plary embodiment of a fluid system. In the first exemplary
embodiment, the fluid to be delivered is a hydraulic fluid, in
particular a hydraulic liquid. Accordingly, FIG. 1 also shows
a schematic hydraulic diagram. In principle, the symbols in
the hydraulic diagram shown in FIG. 1 correspond to the
general symbols of a hydraulic diagram known in mechani-
cal engineering. For example, hydraulic conduits are repre-
sented by the lines. The fluid system 1 represented in FIG.
1 comprises a pump 2, a first actuator 7 and a second
actuator 8.

The pump 2 is designed to deliver a hydraulic fluid and
has a first fluid connection 3 and a second fluid connection
4 for this purpose. The pump 2 can be, for example, an
internal gear pump, an external gear pump or a rotary vane
pump. In a first delivery direction 5, the pump 2 delivers the
hydraulic fluid from the second fluid connection 4 to the first
fluid connection 3. This means that, in the first delivery
direction 5, the second fluid connection 4 forms a low-
pressure connection of the pump 2. The first fluid connection
3 forms a high-pressure connection of the pump 2 in the first
delivery direction 5. The pump 2 is furthermore designed to
reverse the delivery direction. In other words, the pump 2
can have a second delivery direction 6. In the second
delivery direction 6, the pump 2 delivers the hydraulic fluid
from the first fluid connection 3 to the second fluid connec-
tion 4. In the second delivery direction 6, the first fluid
connection 3 forms a low-pressure connection and the second fluid connection 4 forms a high-pressure connection
of the pump 2. In order to reverse the delivery direction, it
can be provided, for example, that the pump 2 changes its
direction of rotation.

The first actuator 7 can be, for example, a first actuator 7
in a chassis of a vehicle. The first actuator 7 can be arranged
in particular on a shock absorber of a vehicle. The first
actuator 7 is connected to the first fluid connection 3 of the
pump 2 via a first actuator valve 9.

The first actuator valve 9 can be moved or switched back
and forth between two different actuator valve positions,
namely a first actuator valve position and a second actuator
valve position different from the first actuator valve position.

In FIG. 1, the first actuator valve 9 is shown in the first
actuator valve position. In the first actuator valve position,
the first actuator valve 9 forms a check valve. For this
purpose, the first actuator valve 9 has a blocking element 27
(not shown). The check valve is designed in such a way that
the existing internal pressure of the actuator presses the
blocking element 27 into a blocking position. For example,
the check valve could additionally be spring-loaded. If the
blocking element 27 reaches the blocking position, the first
actuator valve 9 acts like a blocking valve in the first
actuator valve position. This means that a fluid communi-
cation between the first actuator 7 and the first fluid con-
nection 3 of the pump 2 is prevented by the first actuator
valve 9 in the first actuator valve position. This is the case
in particular when the pump 2 delivers the hydraulic fluid in
the second delivery direction 6. In this case, the pump 2
sucks hydraulic fluid via the first fluid connection 3. The
negative pressure produced by the suction action interacts at
the first actuator valve 9 with the internal pressure of the first
actuator 7 in such a way that the blocking element 27 is
pressed into the blocking position. No fluid communication
is possible between the first actuator 7 and the first fluid
connection 3 of the pump 2 when the first actuator valve 9
is in the first actuator valve position and the pump 2 pumps
in the second delivery direction 6.

In the first actuator valve position, the check valve of the
first actuator valve 9 permits a fluid communication between
the first actuator 7 and the first fluid connection 3 of the
pump 2 when the pump 2 delivers the hydraulic fluid in the
first delivery direction 5. This is caused by the hydraulic
fluid flowing in from the first fluid connection 3 of the pump
2 being under pressure in such a way that the hydraulic fluid
presses the blocking element 27 into a passage position
against to the internal pressure of the first actuator 7. In the
passage position, the first actuator valve 9 forms a fluid
passage. In other words, the hydraulic fluid can flow from
the first fluid connection 3 via the first actuator valve 9 into
the first actuator 7 and increase the oil volume within the
first actuator 7 when the first actuator valve 9 is in the first
actuator valve position and the pump 2 delivers the hydrau-
lic fluid in the first delivery direction 5.

In the second actuator valve position, the first actuator
valve 9 forms a fluid passage. This means that the hydraulic
fluid can flow out of the first actuator 7 in the direction of the
reservoir 13 when the first actuator valve 9 is in the second
actuator valve position. In the illustration shown in FIG. 1,
the first actuator valve 9 would shift to the left in order to
change from the first actuator valve position to the second
actuator valve position. The first actuator 7 is fluidically
relieved only when the pump 2 delivers the hydraulic fluid
in the second delivery direction 6 and the first actuator valve
9 is in the second actuator valve position.

Independently of the first actuator 7, the second actuator
8 can form a second actuator 8 in a chassis of a vehicle. The second actuator 8 can be arranged in particular on a further shock absorber of a vehicle. The second actuator 8 is connected to the first fluid connection 3 of the pump 2 via a second actuator valve 10.

The second actuator valve 10 is designed analogously to the first actuator valve 9 in the exemplary embodiment represented.

The second actuator valve 10 is also shown in a first actuator valve position in FIG. 1. In the first actuator valve position, the second actuator valve 10 forms a check valve analogously to the first actuator valve 9. The second actuator valve 10 acts like a blocking valve in the first actuator valve position when the pump 2 delivers in the second delivery direction 6. This means that a fluid communication between the second actuator 8 and the first fluid connection 3 of the pump 2 is prevented by the second actuator valve 10 in the first actuator valve position when the pump 2 delivers in the second delivery direction 6.

In the first actuator valve position, the check valve of the second actuator valve 10 permits a fluid communication between the second actuator 8 and the first fluid connection 3 of the pump 2 when the pump 2 delivers the hydraulic fluid in the first delivery direction 5. In other words, the hydraulic fluid can flow from the first fluid connection 3 of the pump 2 via the second actuator valve 10 into the second actuator 8 and act upon the latter with hydraulic pressure when the second actuator valve 10 is in the first actuator valve position and the pump 2 delivers the hydraulic fluid in the first delivery direction 5.

In the second actuator valve position, the second actuator valve 10 forms a fluid passage analogously to the first actuator valve 9. This means that the hydraulic fluid can flow starting from the second actuator 8 in the direction of the reservoir 13 when the second actuator valve 10 is in the second actuator valve position. In the illustration shown in FIG. 1, the second actuator valve 10 would shift to the left in order to change from the first actuator valve position to the second actuator valve position. The second actuator 8 is fluidically relieved only when the second actuator valve 10 is in the second actuator valve position and the pump 2 delivers the hydraulic fluid in the second delivery direction 6.

In the exemplary embodiment shown in FIG. 1, the two actuator valves 9, 10 can be hydraulically controlled. This means that the first actuator valve 9 and/or the second actuator valve 10 can be moved or switched back and forth between the first actuator valve position and the second actuator valve position via hydraulic actuation. For this purpose, the first actuator valve 9 and the second actuator valve 10 each have a control connection (shown in each case on the right of the corresponding actuator valve 9, 10 in FIG. 1). To control the actuator valve positions of the two actuator valves 9, 10, the fluid system 1 has a control valve 11. The control valve 11 is designed as a 4/3 directional control valve in the exemplary embodiment represented. The control valve 11 is connected to the second fluid connection 4 of the pump 2 via a check valve 12. The check valve 12 has the effect that when the pump 2 delivers the hydraulic fluid in the first delivery direction 5, the control valve 11 is fluidically separated from the second fluid connection 4 of the pump 2. However, if the pump 2 delivers the hydraulic fluid in the second delivery direction 6, the control valve 11 and the second fluid connection 4 of the pump 2 are fluidically connected to one another via the check valve 12. This means that the hydraulic fluid under pressure passes from the second fluid connection 4 of the pump 2 to the control valve 11 when the pump 2 delivers the hydraulic fluid in the second delivery direction 6.

The control valve 11 can be moved or switched back and forth between three control valve positions which are different from one another, namely a first control valve position, a second control valve position and a third control valve position. To illustrate the mode of operation of the control valve 11, it is assumed for the following explanations that the pump 2 delivers the hydraulic fluid in the second delivery direction 6.

FIG. 1 shows the control valve 11 in the first control valve position. In the first control valve position, the hydraulic fluid is conducted via the control valve 11 to the control connection of the second actuator valve 10. Owing to the hydraulic pressure then prevailing at the control connection of the second actuator valve 10, the second actuator valve 10 is moved from the first actuator valve position into the second actuator valve position (not represented in FIG. 1). As a result, the second actuator 8 is fluidically relieved via the second actuator valve 10. The control connection of the first actuator valve 9 is connected to a reservoir 13 via the control valve 11 in the first control valve position. This means that the first actuator valve 9 remains in the first actuator valve position when the control valve 11 is in the first control valve position. When the control valve 11 is moved or switched into the second control valve position, the control valve 11 is designed to conduct the fluid pressure of the hydraulic liquid to the control connection of the first actuator valve 9 and to the control connection of the second actuator valve 10. In this case, both actuator valves 9, 10 would move from the first actuator valve position into the second actuator valve position. As a result, both the first actuator 7 and the second actuator 8 would be fluidically relieved.

When the control valve 11 is moved or switched into the third control valve position, the control valve 11 is designed to conduct the hydraulic fluid to the control connection of the first actuator valve 9. Owing to the hydraulic pressure then prevailing at the control connection of the first actuator valve 9, the first actuator valve 9 is moved from the first actuator valve position into the second actuator valve position (not represented in FIG. 1). As a result, the first actuator 7 is fluidically relieved via the first actuator valve 9. The control connection of the second actuator valve 10 is connected to a reservoir 13 via the control valve 11 in the third control valve position. This means that the second actuator valve 10 remains in the first actuator valve position when the control valve 11 is in the third control valve position. In the exemplary embodiment represented, the control valve 11 is designed to be hydraulically open-loop or closed-loop controllable. The control connection of the control valve 11 is fluidically connected to the second fluid connection 4 of the pump 2. By varying the hydraulic pressure, for example by varying the rotation rate of the pump 2, the control connection of the control valve 11 can then be acted upon with different, in particular three different, pressure levels. Preferably, each pressure level corresponds to a control valve position of the control valve 11. The control valve 11 comprises an orifice opening 23 which allows hydraulic fluid to flow out of the control valve 11 into a reservoir 13. Thus, when hydraulic fluid is delivered by the pump 2 in the second delivery direction 6, the hydraulic fluid can flow into the reservoir 13 independently of the rotation rate of the pump 2, independently of the pressure level prevailing at the radial opening 16 and independently of the control valve position of the control valve 11.

In an exemplary use of the first exemplary embodiment of the fluid system 1, it can be provided that each of the actuators 7, 8 is assigned to a vehicle axle and/or a wheel suspension of a vehicle. For example, each actuator can be a suspension strut actuator. Alternatively, each of the actuators 7, 8 can be assigned to a vehicle axle. During the starting process of the vehicle, it is conceivable, for example, for the pump 2 to deliver the hydraulic fluid in the first delivery direction 5. In this case, the pump 2 will suck in the hydraulic fluid from a reservoir 13 via the second fluid connection 4. In the first delivery direction 5, the pump 2 pumps the hydraulic fluid further into the fluid system 1 via the first fluid connection 3. As represented in FIG. 1, the two actuator valves 9, 10 are initially each in the first actuator valve position. This has the effect that the hydraulic fluid is pumped from the first fluid connection 3 of the pump 2 into the two actuators 7, 8, with the result that the vehicle is raised.

If a selective lowering of the vehicle is desired in the further course of time, the delivery direction of the pump 2 can be reversed, in particular can be reversed from the first delivery direction 5 into the second delivery direction 6. Via the control valve position of the control valve 11, in each case one of the two actuators 7, 8 can then be fluidically relieved in the manner described above. Alternatively, both actuators 7, 8 can also be fluidically relieved at the same time, namely when the control valve 11 is in the second control valve position.

Figure 2:
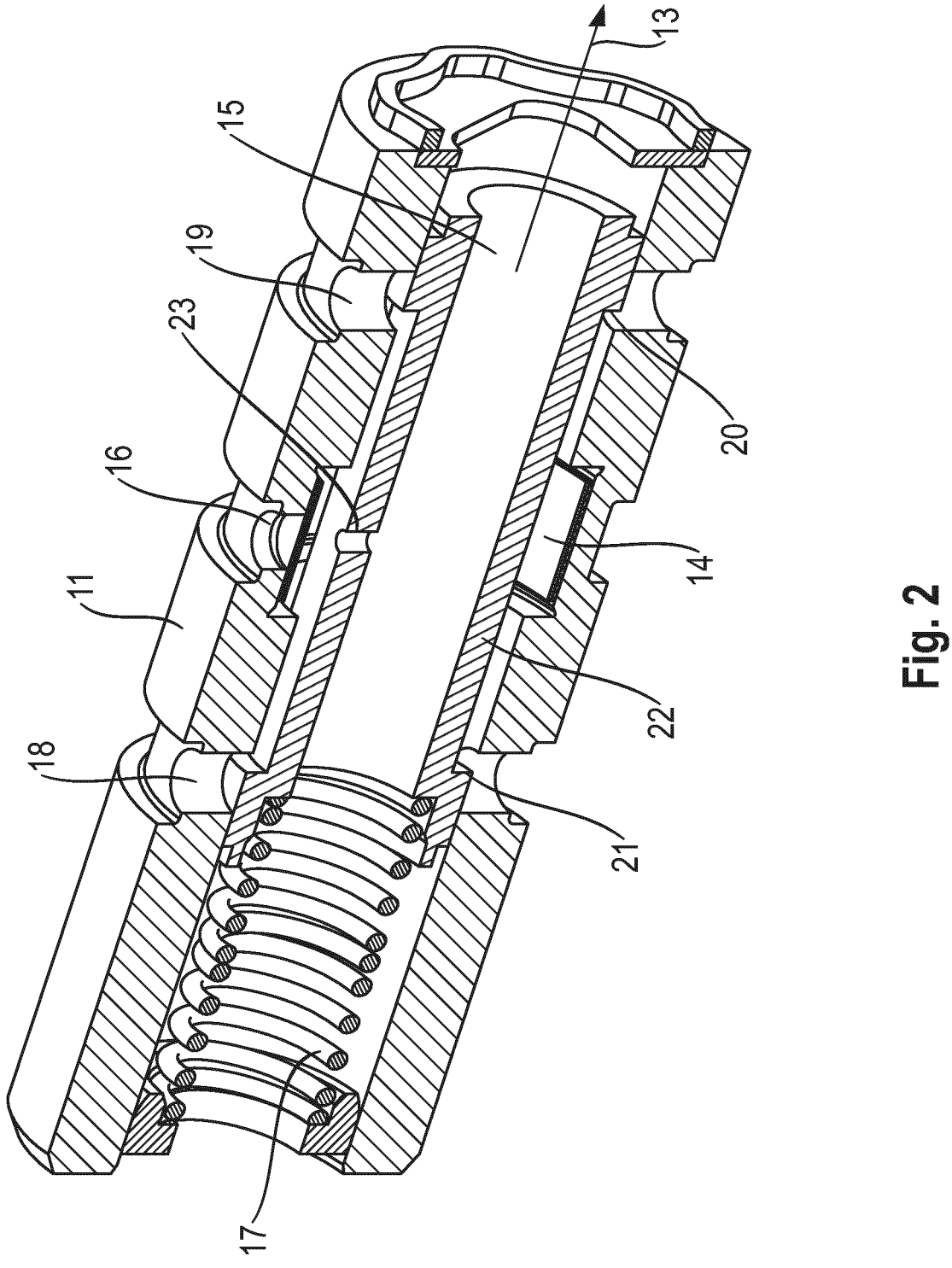
FIG. 2 a perspective sectional illustration of a control
valve.

FIG. 2 shows a perspective sectional illustration of a control valve 11. The control valve 11 is designed as a 4/3 proportional valve in the form of a cylindrical sleeve. Located in the interior of the control valve 11 is a stepped piston 15 which can be transferred between three different switching positions.

The stepped piston 15 comprises a first stage 20 and a second stage 21. The first stage 20 and the second stage 21 are each located at the opposite ends of the stepped piston 15. Located between the first stage 20 and the second stage 21 is a piston neck portion 22 with a reduced outside diameter. The radial outside diameter of the second stage 21 is greater than the radial outside diameter of the first stage 20. This produces an axial surface difference starting from the piston neck portion 22 and the first stage 20 in comparison with the piston neck portion 22 and the second stage 21. The axial surface which is produced by the second stage 21 is thus greater than the axial surface which is produced by the first stage 20.

Fluid can flow into the control valve 11 starting from the second fluid connection 4 of the pump 2 (not shown) via a radial opening 16. In the pressureless state, the radial opening 16 is blocked by the band check valve 14, for which reason no fluid can flow into the control valve 11. In this starting position, the stepped piston 15 is transferred into a first end position by an axial compression spring 17. In the axial direction of the control valve 11, a first fluid outflow opening 18 and a second fluid outflow opening 19 are each arranged above and below the radial opening 16. The first fluid outflow opening 18 can be connected fluidically to the first actuator valve 9. The second fluid outflow opening 19 can be connected fluidically to the second actuator valve 10.

When a critical pressure threshold of the fluid applied at the radial opening 16 is reached, the band check valve 14 is deformed and fluid flows into the control valve 11 via the radial opening 16. The critical pressure threshold can be set by means of operation of the pump 2 at a first rotation rate via the second delivery direction 6. The control valve 11 thus assumes the first switching position. Fluid can flow into the control valve 11 in this first switching position. The stepped piston 15 is still in the first end position by the axial compression spring 17, as a result of which there is a fluid connection only between the radial opening 16 and the second fluid outflow opening 19. In other words, fluid can flow into the control valve 11 starting from the second fluid connection 4 of the pump 2 (not shown) via a radial opening 16 and flow out of the second fluid outflow opening 19 to the second actuator valve 10 via the piston neck portion 22 of the stepped piston 15.

When the fluid pressure at the radial opening 16 increases further to a second pressure threshold, both the first actuator valve 9 and the second actuator valve 10 are connected to the second fluid connection 4 in a fluid-communicating manner. As a result of the second pressure threshold, the axial surface difference which is produced by the second stage 21 and by the first stage 20 takes effect. As a result of the greater axial surface proportion at the second stage 21, an axial force is produced which is directed against the force of the axial compression spring 17. As a result, the stepped piston 15 is transferred out of the first end position against the axial compression spring 17 into a central position which produces a fluidic connection both between the radial opening 16 and the first fluid outflow opening 18 and between the radial opening 16 and the second fluid outflow opening 19. The second pressure threshold can be set by means of operation of the pump 2 at a second rotation rate via the second delivery direction 6.

When the fluid pressure at the radial opening 16 increases further to a third pressure threshold, the first actuator valve 9 is connected to the second fluid connection 4 in a fluid-communicating manner. The control valve 11 assumes the third switching position. As a result of the third pressure threshold, the axial surface difference which is produced by the second stage 21 and by the first stage 20 takes effect to an even greater extent. As a result of the greater axial surface proportion at the second stage 21, the axial force is increased which is directed against the force of the axial compression spring 17. As a result, the stepped piston 15 is transferred out of the central position against the axial compression spring 17 into a second end position which produces a fluidic connection only between the radial opening 16 and the first fluid outflow opening 18. By contrast, the fluidic connection between the radial opening 16 and the second fluid outflow opening 19 is closed. The third pressure threshold can be set by means of operation of the pump 2 at a third rotation rate via the second delivery direction 6.

The different pressure thresholds described are realized by different fluid pressures starting from the pump 2. In this case, a targeted rotation rate control of the pump 2 takes place. The higher the rotation rate of the pump 2, the greater the fluid pressure applied to the control valve 11. Thus, fluid can be delivered by the pump 2 in the second delivery direction 6, as a result of which the rotation rate of the pump correlates with a specific fluid pressure at the control valve 11. A specific applied fluid pressure thus corresponds to a specific switching position. Hydraulic fluid flows out of the control valve 11 back again into a reservoir 13 via an orifice opening 23. This takes place independently of the rotation rate of the pump 2 and thus also independently of the pressure level prevailing at the radial opening 16.

Figure 3:
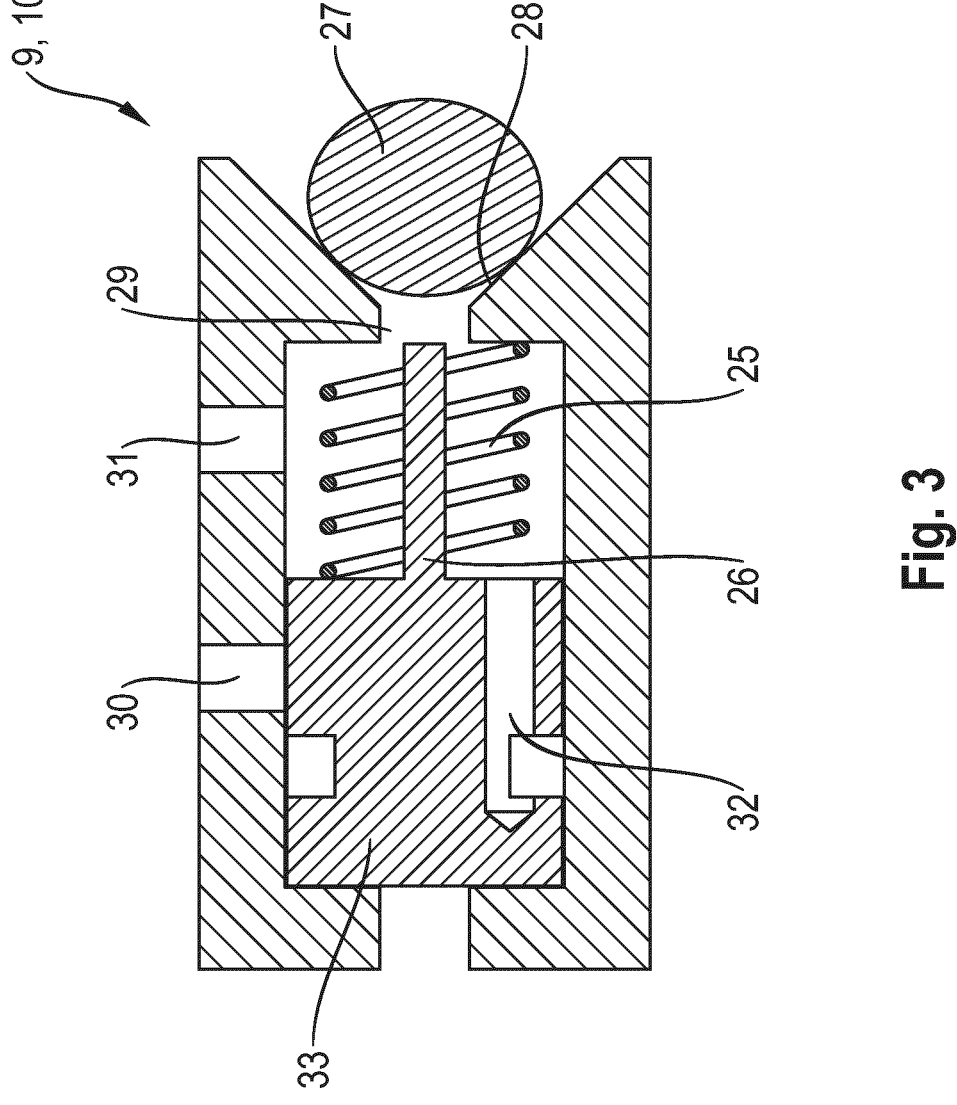
FIG. 3 a schematic sectional illustration of an actuator
valve in the first actuator valve position.

FIG. 3 shows a schematic sectional illustration of an actuator valve 9, 10 in the first actuator valve position. The resetting spring 25 holds the actuating piston 33 in a retracted position, as a result of which there is an unhindered fluid connection from the actuator valve inlet 31 for inflowing fluid to the valve seat opening 29 and thus for overcoming the closing element 27 and flowing into an actuator 7, 8.

The actuating piston 33 comprises a pin-shaped extension 26 which interacts with the valve seat opening 29 and is designed as a throttling cross section for a fluid flow. The pin-shaped extension 26 of the actuator valve 9, 10 here enters the valve seat opening 29 in the valve seat 28 of the closing element 27 and thus forms a circular throttling cross section for the volume flow when fluid flows out of the actuator 7, 8. In the non-actuated state, the pin-shaped extension 26 together with the actuating piston 33 is retained by the resetting spring 25 to such an extent that the flow cross section is not narrowed when the actuator 7, 8 is filled. Therefore, when the pump 2 is actuated in the first delivery direction 5, fluid can flow through the actuator valve inlet 31 into the actuator valve 9, 10 when the respective actuator valve 9, 10 is in the first actuator valve position. The closing element 27 is transferred into an open state by the delivery pressure of the pump 2 when the delivery pressure exceeds the internal pressure of the actuator 7, 8. The actuator 7, 8 is thus filled by fluid flowing in through the actuator valve inlet 31. When the pump 2 is actuated at a first rotation rate via the second delivery direction 6 and the control valve 11 is thereby transferred into the second actuator valve position, the pin-shaped extension 26 comes into contact with the closing element 27.

Here, the pin-shaped extension 26 comes into contact with the closing element 27 through the valve seat opening 29, as a result of which the pin-shaped extension 26 of the actuator valve 9, 10 forms a circular throttling cross section with the internal diameter of the valve seat opening 29 in the valve seat 28 of the closing element 27. The circular throttling cross section makes it possible to precisely control the volume flow when fluid flows out of the actuator 7, 8. When fluid flows out of the actuator 7, 8, it flows through the throttling cross section and then through an outlet connecting channel 32. The fluid passes from the outlet connecting channel 32 via an actuator valve outlet 30 into a reservoir 13 (not shown).

| Reference Signs | |
| --- | --- |
| 1 | Fluid system |
| 2 | Pump |
| 3 | First fluid connection of the pump |
| 4 | Second fluid connection of the pump |
| 5 | First delivery direction |
| 6 | Second delivery direction |
| 7 | First actuator |
| 8 | Second actuator |
| 9 | First actuator valve |
| 10 | Second actuator valve |
| 11 | Control valve |
| 12 | Check valve |
| 13 | Reservoir |
| 14 | Band check valve |
| 15 | Stepped piston |
| 16 | Radial opening |
| 17 | Compression spring |
| 18 | First fluid outflow opening |
| 19 | Second fluid outflow opening |
| 20 | First stage |
| 21 | Second stage |
| 22 | Piston neck portion |
| 23 | Orifice opening |
| 25 | Resetting spring |
| 26 | Pin-shaped extension |
| 27 | Closing element |
| 28 | Valve seat |
| 29 | Valve seat opening |
| 30 | Actuator valve outlet |

-continued

| Reference Signs | |
| --- | --- |
| 31 | Actuator valve inlet |
| 32 | Outlet connecting channel |
| 33 | Actuating piston |

The invention claimed is:

1. A fluid system for a vehicle, the fluid system comprising:
a pump for delivering a fluid, wherein the pump has a first fluid connection and a second fluid connection;
a first actuator configured to be connected to the first fluid connection in a fluid-communicating manner via a first actuator valve;
a second actuator configured to be connected to the first fluid connection in a fluid-communicating manner via a second actuator valve, wherein the pump is configured to deliver fluid to be delivered in a first delivery direction and in a second delivery direction opposite the first delivery direction, so that the first actuator and the second actuator are fluidically pressurized by the pump via the first fluid connection when the pump delivers in the first delivery direction, and
a control valve for controlling the first actuator valve and the second actuator valve, wherein the control valve is fluidically separated from the second fluid connection when the pump delivers in the first delivery direction, and the control valve is connected to the second fluid connection in a fluid-communicating manner when the pump delivers in the second delivery direction,
wherein the control valve is configured to be hydraulically controlled.

2. A fluid system for a vehicle, the fluid system comprising:
a pump for delivering a fluid, wherein the pump has a first fluid connection and a second fluid connection;
a first actuator configured to be connected to the first fluid connection in a fluid-communicating manner via a first actuator valve;
a second actuator configured to be connected to the first fluid connection in a fluid-communicating manner via a second actuator valve, wherein the pump is configured to deliver fluid to be delivered in a first delivery direction and in a second delivery direction opposite the first delivery direction, so that the first actuator and the second actuator are fluidically pressurized by the pump via the first fluid connection when the pump delivers in the first delivery direction, and
a control valve for controlling the first actuator valve and the second actuator valve, wherein the control valve is fluidically separated from the second fluid connection when the pump delivers in the first delivery direction, and the control valve is connected to the second fluid connection in a fluid-communicating manner when the pump delivers in the second delivery direction,
wherein the control valve has a first switching position to be set by operation of the pump at a first rotation rate via the second delivery direction.

3. The fluid system according to claim 2, wherein the second actuator is connected to the second fluid connection in a fluid-communicating manner via the second actuator valve when the control valve assumes the first switching position.

4. The fluid system according to claim 2, wherein the control valve has a second switching position to be set by operation of the pump at a second rotation rate via the second delivery direction.

5. The fluid system according to claim 4, wherein the first actuator is connected to the second fluid connection in a fluid-communicating manner via the first actuator valve and the second actuator is connected to the second fluid connection in a fluid-communicating manner via the second actuator valve when the control valve assumes the second switching position.

6. The fluid system according to claim 4, wherein the control valve has a third switching position to be set by operation of the pump at a third rotation rate via the second delivery direction.

7. The fluid system according to claim 6, wherein the first actuator is connected to the second fluid connection in a fluid-communicating manner via the first actuator valve when the control valve assumes the third switching position.

8. The fluid system according to claim 6, wherein the second rotation rate of the pump is greater than the first rotation rate, and the third rotation rate of the pump is greater than the second rotation rate.

9. The fluid system according to claim 1, wherein at least one of the first actuator valve or the second actuator valve comprises a pin-shaped extension configured for transferring a closing element from a closed position, in which the closing element rests in a valve seat, into an open position, in which the closing element is spaced apart from the valve seat.

10. The fluid system according to claim 9, wherein the pin-shaped extension interacts with the valve seat of the closing element and is configured as a throttling cross section for a fluid flow.

11. The fluid system according to claim 1, wherein the control valve is a 4/3 directional control valve.

12. The fluid system according to claim 1, wherein the control valve comprises a stepped piston comprising a band check valve and having a radial opening.

13. A chassis for a vehicle, wherein the chassis comprises a fluid system according to claim 1, and the first actuator and the second actuator are each a suspension strut actuator of the chassis.

14. A fluid system for a vehicle, the fluid system comprising:

a pump for delivering a fluid, wherein the pump has a first fluid connection and a second fluid connection;

a first actuator configured to be connected to the first fluid connection in a fluid-communicating manner via a first actuator valve;

a second actuator configured to be connected to the first fluid connection in a fluid-communicating manner via a second actuator valve, wherein the pump is configured to deliver fluid to be delivered in a first delivery direction and in a second delivery direction opposite the first delivery direction, so that the first actuator and the second actuator are fluidically pressurized by the pump via the first fluid connection when the pump delivers in the first delivery direction, and a control valve for controlling the first actuator valve and the second actuator valve, wherein the control valve is fluidically separated from the second fluid connection when the pump delivers in the first delivery direction, and the control valve is connected to the second fluid connection in a fluid-communicating manner when the pump delivers in the second delivery direction, wherein at least one of the first actuator valve or the second actuator valve is configured to be connected to a reservoir.

* * * * *